United States Patent
Lv et al.

(10) Patent No.: US 12,305,106 B2
(45) Date of Patent: May 20, 2025

(54) AQUEOUS CARBON DIOXIDE FOAM STABILIZED BY ORGANIC JANUS NANOSHEETS AND PREPARATION METHOD AND APPLICATION THEREOF

(71) Applicant: CHINA UNIVERSITY OF PETROLEUM—BEIJING, Beijing (CN)

(72) Inventors: Qichao Lv, Beijing (CN); Tongke Zhou, Beijing (CN); Zhengen Gao, Beijing (CN); Abdolhossein Hemmati-Sarapardeh, Beijing (CN); Zilong Liu, Beijing (CN); Hossein Jalalifar, Beijing (CN); Rong Zheng, Beijing (CN); Longxuan Li, Beijing (CN); Zhaoxia Dong, Beijing (CN)

(73) Assignee: CHINA UNIVERSITY OF PETROLEUM—BEIJING, Beijing (CN)

( * ) Notice: Subject to any disclaimer, the term of this patent is extended or adjusted under 35 U.S.C. 154(b) by 118 days.

(21) Appl. No.: 18/322,766

(22) Filed: May 24, 2023

(65) Prior Publication Data
US 2024/0228880 A1    Jul. 11, 2024

(30) Foreign Application Priority Data

Jan. 6, 2023    (CN) .......................... 202310017710.4

(51) Int. Cl.
*C09K 23/16*    (2022.01)
*C09K 8/594*    (2006.01)

(52) U.S. Cl.
CPC .............. *C09K 23/16* (2022.01); *C09K 8/594* (2013.01)

(58) Field of Classification Search
CPC ................................ C09K 23/00; C09K 23/16
See application file for complete search history.

(56) References Cited

U.S. PATENT DOCUMENTS

| | | |
|---|---|---|
| 8,986,641 B1 | 3/2015 | Cheng et al. |
| 2017/0173546 A1 | 6/2017 | Cheng et al. |
| 2020/0231445 A1 | 7/2020 | Ren et al. |

FOREIGN PATENT DOCUMENTS

| | | | | |
|---|---|---|---|---|
| CN | 105038756 A | 11/2015 | | |
| CN | 110540833 A | 12/2019 | | |
| CN | 110684209 A | 1/2020 | | |
| CN | 113813933 A | * 12/2021 | ............ | B01D 15/08 |
| CN | 114989417 A | 9/2022 | | |
| KR | 1020150057168 A | 5/2015 | | |

OTHER PUBLICATIONS

Machine Translation of CN113813933A. Dec. 21, 2021. (Year: 2021).*
Sheng et al. Mussel-Inspired Two-Dimensional Freestanding Alkyl-Polydopamine Janus Nanosheets. Angew. Chem. Int. Ed. 2019, 58, 12018-1022. With supporting information. Published Jul. 7, 2019. (Year: 2019).*
Wang et al. Sequential assembly enabled surface precise imprinting on Janus nanosheets for highly specific separation of adenosine 5'-monophosphate. Chemical Engineering Journal, 2022, 432, 134349. With supporting information. Published Dec. 28, 2021. (Year: 2021).*
Notification to Grant Patent Right for Invention issued on Sep. 5, 2024, in corresponding Chinese Application No. 202310017710.4, 3 pages.
Office Action issued on Jun. 1, 2024, in corresponding Chinese Application No. 202310017710.4, 11 pages.
Sheng et al., "Mussel-Inspired Two-Dimensional Freestanding Alkyl-Polydopamine Janus Nanosheets", Angewandte Chemie International Edition, Wiley-VCH Verlag GmbH & Co. KGaA, Jul. 2019, vol. 58, 7 pages.
Wang et al., "Research Progress on Performance Improvement Method of CO2 Foam System", Oilfield Chemistry, China Academic Journal Electronic Publishing House, Dec. 25, 2017, vol. 34, No. 4, 8 page (English abstract provided).

* cited by examiner

*Primary Examiner* — Stephen E Rieth
(74) *Attorney, Agent, or Firm* — Maier & Maier, PLLC

(57) ABSTRACT

An aqueous carbon dioxide foam stabilized by organic Janus nanosheets, a preparation method and application thereof. The preparation method can be provided as: S1: subjecting molecules with hydrophobic tail to spontaneous and ordered arrangement in a mixture of ethanol and water; S2: adding molecules with hydrophilic head to the solution of S1, and adjusting a pH value to 6.0-6.5 to perform a synthesis of organic Janus nanosheet monomers; S3: adding ethanol to the solution of S2, and adjusting the pH value to 6.0-6.5 to perform a heating reflux; then adjusting the pH value to 7.0-8.0, and adding sodium ethylate, adjusting a temperature to 70-85° C. to perform a reaction under an inert atmosphere, and then adjusting the pH to 8.0-9.0, and stirring to be completely dissolved. The aqueous $CO_2$ foam is prepared from $CO_2$ and a liquid phase.

4 Claims, 3 Drawing Sheets

Surface of hydrophilic glass

Coated JNS surface

Hydrophobic modification surface

Coated JNS surface after hydrophobic modification

AQUEOUS CARBON DIOXIDE FOAM STABILIZED BY ORGANIC JANUS NANOSHEETS AND PREPARATION METHOD AND APPLICATION THEREOF

CROSS-REFERENCE TO RELATED APPLICATION

This application claims priority to Chinese Patent Application No. 202310017710.4, filed on Jan. 6, 2023, which is hereby incorporated by reference in its entirety.

TECHNICAL FIELD

This application relates to an aqueous carbon dioxide foam stabilized by organic Janus nanosheets, and a preparation method and application thereof, belonging to the technical field of nanomaterial preparation and carbon sequestration and utilization technology.

BACKGROUND

Fossil fuel is one of the main sources of energy supply in the world. However, with the continuous growth of social demands, the huge consumption of fossil fuels has exacerbated the emission of greenhouse gases such as $CO_2$. Excessive emission of $CO_2$ in the atmosphere leads to an increase in the temperature of the earth and drastic climate change. How to reduce the concentration of $CO_2$ in the atmosphere have been widely concerned and paid more attention all over the world. Carbon capture, utilization, and sequestration (CCUS) technology is considered to be one of the most effective solutions to reduce the concentration of $CO_2$ in the atmosphere. Injecting $CO_2$ into formation is currently one of the most potential ways for large-scale $CO_2$ sequestration, such as injection into deep saline aquifers, depleted oil and gas reservoirs, coal seams, and enhanced oil and gas recovery. However, since $CO_2$ has a much lower viscosity and density and a higher mobility than oil and water, the gravity differentiation and fingering are prone to occur during flow in formation, resulting in low sweep efficiency and sequestration capacity.

Foam is a multiphase fluid with a high viscosity, which produces a Jamin effect during a flow in porous media, increases flow resistance, and reduces gas mobility, so it is regarded as an efficient mobility control system. However, foam is a thermodynamically unstable system, and behaviors such as liquid drainage, coalescence, and rupture lead to weakening of the foam effect. Based on the theory of Pickering foam, the stability of the foam can be improved by using nanoparticles to be adsorbed on foam surface. A large number of studies have proved that a nanoparticle-surfactant system can prepare homogeneous foam with higher viscosity, which has a stronger mobility control ability than a foam prepared by pure surfactant solution. Due to its high Jamin resistance and wall friction resistance, the nanoparticle-reinforced foam can control the direction of fluid flow and improve the sweep coefficient.

According to a particle size and an aspect ratio, nanoparticles can be mainly divided into three categories: zero-dimensional nanoparticle, one-dimensional nanoparticle (such as nanowire), and two-dimensional nanoparticle (such as nanosheet). The zero-dimensional nanoparticle is mainly spherical, and the commonly substrate materials are oxides of Si, Ti, Fe, Al and other elements, whose foam stabilizing mechanism is mainly to reduce a contact area between bubbles by being adsorbed on a gas-liquid interface and a Plateau boundary of the foam, thereby forming a dense particle film to inhibit coalescence and coarsening of bubbles, and to prolong a drainage time of the liquid film, as well as to improve a skeleton strength of the liquid film. Additionally, nanoparticles can improve the interfacial viscoelasticity of the liquid film, and enhance a self-recovery ability of the liquid film when it is impacted by an external force. However, due to morphology characteristics of zero-dimensional nanomaterial, it is partially stacked and adsorbed on the surface of the liquid film, which is prone to slippage, thereby causing the limited effect of reducing coalescence. Additionally, $CO_2$ is more diffusible and $CO_2$ foams are less stable than air or nitrogen foams. The spherical zero-dimensional nanomaterials have small aspect ratio and size, so a larger amount of them is required to form a nano-reinforced film by adsorption at the gas-liquid interface. The gap between particles is large, so the inhibition effect of $CO_2$ diffusion is limited. For one-dimensional nanoparticles, increased viscosity of the liquid phase is mainly due to forming a network structure in the liquid film, thereby inhibiting the thinning of the liquid film caused by liquid drainage and then improving the stability of the foam. On the other hand, one-dimensional nanoparticles can promote a closer arrangement of surfactant molecules at the interface, and increase the difficulty of gas permeating the liquid film, thereby slowing down the coalescence and disproportionation of bubbles. However, one-dimensional nanoparticles also have obvious shortcomings. Mechanical strength of the liquid film cannot be effectively enhanced, and the distribution of one-dimensional nanoparticles on the surface of the liquid film is generally uneven. Additionally, at a slightly higher concentration, they are easy to self-wind and agglomerate into macromolecular polymer, which makes them difficult to maintain stable state at the phase interface. Additionally, similar to zero-dimensional nanoparticles, one-dimensional nanoparticles still need to be adsorbed in a large amount when stabilizing $CO_2$ foam, resulting in an increase in cost.

Based on above problems, utilization of two-dimensional nanoparticles to stabilize phase interfaces has attracted attention. Firstly, from the morphological analysis, compared with zero-dimensional and one-dimensional nanoparticles, two-dimensional nanoparticles have a potential to be more stably adsorbed on the phase interface due to unique sheet-like morphology and larger aspect ratio thereof. Hence, an interfacial armored film is formed at the interface. Two-dimensional nanoparticles are not easy to fall off the interface, which is low in amount. And the gap between the nanosheets is small, limiting the mass transfer phenomenon between bubbles, resulting in a stronger potential to inhibit the diffusion of $CO_2$ between bubbles. Secondly, according to adsorption energy, it is difficult to effectively adsorb two-dimensional nanosheets to the surface of emulsion or bubbles to improve stability, which is mainly affected by hydrophilic and hydrophobic characteristics and size control of nanosheets. Due to the two-side characteristics of nanosheets and inspiration by the molecular structure of a surfactant, two sides of two-dimensional nanosheets can be endowed with hydrophilic and hydrophobic properties, so that they can obtain completely opposite properties, that is, Janus characteristics. Janus particles tend to the phase interface spontaneously, forming a stable and reinforced layer of emulsion or foam. At present, the two-dimensional Janus nanosheets are often used to prepare Pickering emulsion, which has great application potential in cosmetics, construction, medicine, and other industries. However, compared with an oil-water phase interface, the gas-water phase interface of foam has a greater interfacial tension and more intensive phenomenon of gas diffusion and the like, especially for $CO_2$ gas. Therefore, it is more difficult to stabilize the gas-water interface. At present, there are few reports on the foam stabilized by Janus nanosheets. The strong instability of the foam poses a great challenge to the hydrophilic-hydrophobic balance and size for easiness to tight adsorption of Janus nanosheets. Therefore, it is necessary to provide a method that can synthesize Janus nanosheets at low cost and under mild conditions, and can be used to tightly cover the surface of the foam to form an ultra-stable aqueous $CO_2$ foam, so as to effectively control the mobility of $CO_2$ in the process of moving in porous media, and then improve $CO_2$ sequestration safety and geological sequestration capacity.

SUMMARY

The object of this application is to provide an aqueous carbon dioxide foam stabilized by organic Janus nanosheets, where two-dimensional organic Janus nanosheets have evenly-distributed amphiphilic groups, strong Janus characteristics, controllable nanosheet size, and simple synthesis; the two-dimensional organic Janus nanosheets involved in this application can form a dense nano-armored layer on the surface of a bubble, inhibit the diffusion of $CO_2$, and improve the stability of the foam. The interface of the nano-armored layer has strong viscoelasticity, which can effectively inhibit the $CO_2$ channeling, control the $CO_2$ mobility, and help to enlarge the scope of $CO_2$ sequestration and improve the geological sequestration capacity.

The "two-dimensional nanomaterial" mentioned in this application refers to a nanomaterial with one dimension in nanometer size, such as nanosheet, nanomembrane and the like.

At first, the present application provides a preparation method of organic Janus nanosheet, comprising the following steps:
S1: grinding the molecules with primary amino groups as hydrophobic tail and long-chain alkanes fully in a mixture of ethanol or other monohydric alcohol and water, and stirring slowly at a temperature 3-5° C. higher than room temperature (such as 20-25° C.) until a stirred solution is free of turbidity and the molecules with hydrophobic tail are completely dissolved, during this step, large vibrations should be avoided so as to perform a spontaneous and ordered arrangement
S2: adding the molecules with hydrophilic groups such as amino groups and carboxy groups as hydrophilic head and hydroxyl groups to the solution obtained in step S1, adding a small amount of weak acid (such as maleic acid, acetic acid, etc.) to adjust a pH value to 6.0-6.5, and gradually lowering the temperature by 5-10° C. every 20-30 min under an inert atmosphere until room temperature (such as 20-25° C.) to perform a synthesis of organic Janus nanosheet monomer, during this step, a significantly darker color will be observed, indicating that a nucleophilic addition reaction has occurred;
S3: adding ethanol to a solution obtained in step S2 to adjust a solvent composition ratio, and adding dropwise weak acid to adjust a pH value to 6.0-6.5, and standing for 5-10 min; then adjusting the pH value to 7.0-8.0, adding sodium ethylate, and adjusting a temperature to 70-85° ° C. to obtain a mixed system; adding the mixed system to a condensing and refluxing device to react under an inert atmosphere; adding NaOH to the reaction system to adjust the pH value to 8.0-9.0, stirring to be completely dissolved, stopping stirring, and standing to obtain the organic Janus nanosheets.

In the above preparation method, the molecule with hydrophobic tail is long-chain alkane of primary amine group such as octadecylamine or dodecylamine;
the molecule with hydrophilic head is an aromatic hydrocarbon compound containing phenolic hydroxyl group and hydrophilic group, such as dopamine, tyramine or 2,4-dihydroxy phenethylamine.

In the above preparation method, in step S1, the mass ratio of the molecules with hydrophobic tail, the ethanol and the water is 1:20-100:10-50.

In the above preparation method, in step S1, the step of spontaneous and ordered arrangement is as follows:
adding the molecules with hydrophobic tail to the ethanol or other monohydric alcohol solution, performing refluxing at 60-80° C. to be dissolved; then adding the water, stirring until no turbidity occurs; and performing spontaneous and ordered arrangement.

In the above-mentioned preparation method, in step S2, the reflux is carried out under the following conditions:
an initial temperature is 50-80° C. which is lowered by 5-10° C. every 20-30 min, and gradually reduced to room temperature;
in a system of step S2, the molecules with hydrophilic head have a mass percentage of 0.5-1.5%;
a mass ratio of the molecules with hydrophilic head to the molecules with hydrophobic tail is 1:2-5, preferably 1:3.

In the above preparation method, in step S3, a reaction time is 4-8 h;
a mass ratio of the ethanol to the solution obtained in step S2 is 1:1.5-3;
in the system of step S3, the sodium ethylate has a mass percentage of 0.1-0.4%.

In the above preparation method, in step S3, after the reaction is finished, the following purification steps are further included:
adding ethanol and water successively to the system in step S3, performing ultrasonic dispersion and centrifugation to obtain a solid product; vacuum freeze-drying to obtain powdery organic Janus nanosheets, and storing, where the thickness of the prepared Janus nanosheets is controlled to be 5-40 nm.

The above ethanol and water are added into the system in step S3 to obtain a solution, respectively. During the above-mentioned ultrasonic dispersion step, the solution is divided into batches with a small amount of solution, and the ultrasonic dispersion can be carried out for each batch;
the ultrasonic dispersion is performed using the ethanol for 20-60 min;
the ultrasonic dispersion is performed using the water for 20-60 min;
the above ultrasonic dispersion can be repeated for 2 to 5 times.

A volume ratio of the solution obtained in step S3, the ethanol and the water is 1:4-10:8-20.

In the two-dimensional organic Janus nanosheets prepared by the method of this application, the groups of hydrophobic tail and the groups of hydrophilic head are synthesized into the nanosheets in proportion, where the groups are more uniformly distributed and the Janus characteristic is stronger; and the Janus nanosheets have controllable aspect ratio and regular shape.

The contact angle test of the two-dimensional organic Janus nanosheets prepared by the method of this application shows that they have an ability of wettability alteration.

On the basis of the two-dimensional organic Janus nanosheets, this application further provides a stable aqueous $CO_2$ foam made of $CO_2$ and a liquid phase;

the liquid phase is an aqueous solution of a surfactant and the organic Janus nanosheets;

the aqueous $CO_2$ foam has a foam quality of 40% to 95%, more preferably 60%-90%, where the foam quality refers to a percentage of volume of gas in the foam to total volume of the foam.

Specifically, in the liquid phase, the surfactant has a mass percentage of less than 1.0%, preferably 0.2%-1.0%;

the organic Janus nanosheets have a mass percentage of less than 0.7%, preferably 0.05%-0.7%, more preferably 0.05%, 0.08%, 0.1%, 0.15%, 0.18%, 0.2%, 0.3%, 0.4% or a range consisted by any two thereof;

the surfactant can be an anionic surfactant, a cationic surfactant or a nonionic surfactant, the anionic surfactant is preferably sodium dodecyl sulfate (SDS), and the cationic surfactant is preferably cetyltrimethylammonium bromide (CTAB), and the nonionic surfactant is preferably octylphenyl polyoxyethylene ether (TX-100).

The preparation method of aqueous $CO_2$ foam of this application includes the following steps:

Sa: adding the organic Janus nanosheets to the aqueous solution of the surfactant, stirring for 10-20 min to obtain a foaming solution;

Sb: injecting $CO_2$ into the foaming solution, and stirring to foam using a Waring Blender method to obtain the aqueous $CO_2$ foam;

where, a stirring speed may be 7000-9000 r/min, and a stirring time may be 3-10 min.

Foaming and foam-stabilizing experiments are performed on the ultra-stable aqueous $CO_2$ foam with organic Janus nanosheets prepared by the method of this application. Results show that the foam with non-ionic surfactant and organic Janus nanosheet has the strongest stability, and as the concentration of nanosheet increases, the foam stability becomes stronger.

The present application has following beneficial effects.

(1) In the ultra-stable aqueous $CO_2$ foam of this application, the two-dimensional organic Janus nanosheets can form a dense nano-armored layer on the surface of the bubbles to inhibit the diffusion of $CO_2$. Due to the large aspect ratio of the nanosheets, high-efficient coating can be formed on the surface of the bubbles, and the dense nano-armored layer can be formed to stabilize $CO_2$ foam under a low concentration of the organic Janus nanosheets, which is beneficial to efficiently carry and store $CO_2$ in underground reservoirs.

(2) In the ultra-stable aqueous $CO_2$ foam of this application, the nano-armored layer has strong interfacial viscoelasticity and large flow resistance in porous media, so it can effectively block channeling channels and inhibit $CO_2$ fingering, thereby controlling $CO_2$ mobility, enlarging $CO_2$ sequestration range, and improving sequestration capacity.

(3) In the ultra-stable aqueous $CO_2$ foam of this application, since a structure having characteristics of the hydrophilic/hydrophobic groups is formed in the synthesis and preparation of the Janus nanosheets, and the structure has electron-donating groups (carbonyl groups), which have Lewis base properties, thus the Janus nanosheets have stronger affinity with $CO_2$ molecules, and to have a good encapsulation effect on $CO_2$ gas, which helps to achieve the purposes of carbon capture, utilization and sequestration.

(4) In the ultra-stable aqueous $CO_2$ foam of this application, the hydrophilic/hydrophobic groups do not participate in the reaction during the synthesis of the two-dimensional organic Janus nanosheets, so they can be replaced with other similar groups to flexibly change the hydrophilic and hydrophobic groups of the Janus nanosheets. Furthermore, the reactants are subjected to addition reaction at a certain ratio, which ensures that the groups of hydrophobic tail and groups of hydrophilic head are formed into sheets at a fixed ratio. Therefore, the amphiphilic groups have more uniform distribution, and the Janus characteristics of the prepared nanosheets are more significant.

(5) In the ultra-stable aqueous $CO_2$ foam of this application, the construction of a phase interface is not required in the synthesis of the two-dimensional organic Janus nanosheets. So the preparation method is simple, and the reaction condition is mild. The preparation process is short, and the yield of Janus nanosheets is high. Additionally, the aspect ratio of the nanosheets can be controlled in the preparation process by adjusting the pH value of the solution and the synthesis time, to obtain the Janus nanosheets in a desired size range.

DETAILED DESCRIPTION OF EMBODIMENTS

Experimental methods used in the following examples are conventional methods unless otherwise specified.

Materials and reagents used in the following examples can be obtained from commercial sources unless otherwise specified.

Example 1: Synthesis of the Organic Janus Nanosheets (1) Spontaneous and Ordered Arrangement of Molecules with Hydrophobic Tail 1.2 g of octadecylamine (ODA) was fully ground and added to 40 g of ethanol solution, followed by stirring in a water bath at a constant temperature of 75° C. and performing a reflux until octadecylamine was completely dissolved; 20 g of deionized water was slowly added to the solution and stirred until the solution was free of turbidity so that octadecylamine molecules were be arranged in a spontaneous and ordered manner in the ethanol-water system; and the temperature of the water bath was adjusted to 60-65° C.

(2) Synthesis of the Organic Janus Nanosheet Monomers 0.4 g of dopamine (DA) was added to the solution obtained in (1), and acetic acid was added to adjust the pH to be 6.0-6.5. A reflux treatment was performed under nitrogen environment, where the initial temperature was set to 60° C., and then the temperature was lowered by 5° C. every 20 min. After reaction for 2 h, heating was stopped, the solution was cooled naturally to room temperature (such as 20-25° C.), thereby finishing the synthesis of the organic Janus nanosheet monomers.

(3) Synthesis of the Organic Janus Nanosheets 40 g of ethanol was added to the solution obtained in (2), and acetic acid was added to adjust the pH to 6.0-6.5. The solution was heated in a water bath and subjected to reflux condensation for 7 min, and ammonia water was added to adjust the pH of solution to 7.5. 0.2 g of sodium ethylate was added to adjust the temperature to 85° C. After stirring at a constant temperature for 6 h under nitrogen environment, NaOH was added to adjust the pH to 8.0-9.0, followed by stirring to be fully mixed and dissolved, cooling to room temperature and taking out the Janus nanosheets. The thickness of the Janus nanosheets is 20-30 nm.

(4) Purification of the Organic Janus Nanosheets 20 mL of solution obtained in (3) was taken out each time, mixed fully with 100 mL of ethanol solution, ultrasonically dispersed and centrifuged for 20 min, and the supernatant was removed to remain the solid product. 200 mL of deionized water was added to the separated solid product, followed by ultrasonic dispersing and centrifuging for 20 min, and removing the supernatant to remain the solid product. The above steps are repeated for 2 to 3 times to obtain the organic Janus nanosheets. The obtained product is subjected to vacuum freeze-drying to obtain powdered organic Janus nanosheets for preservation.

Figure 1:
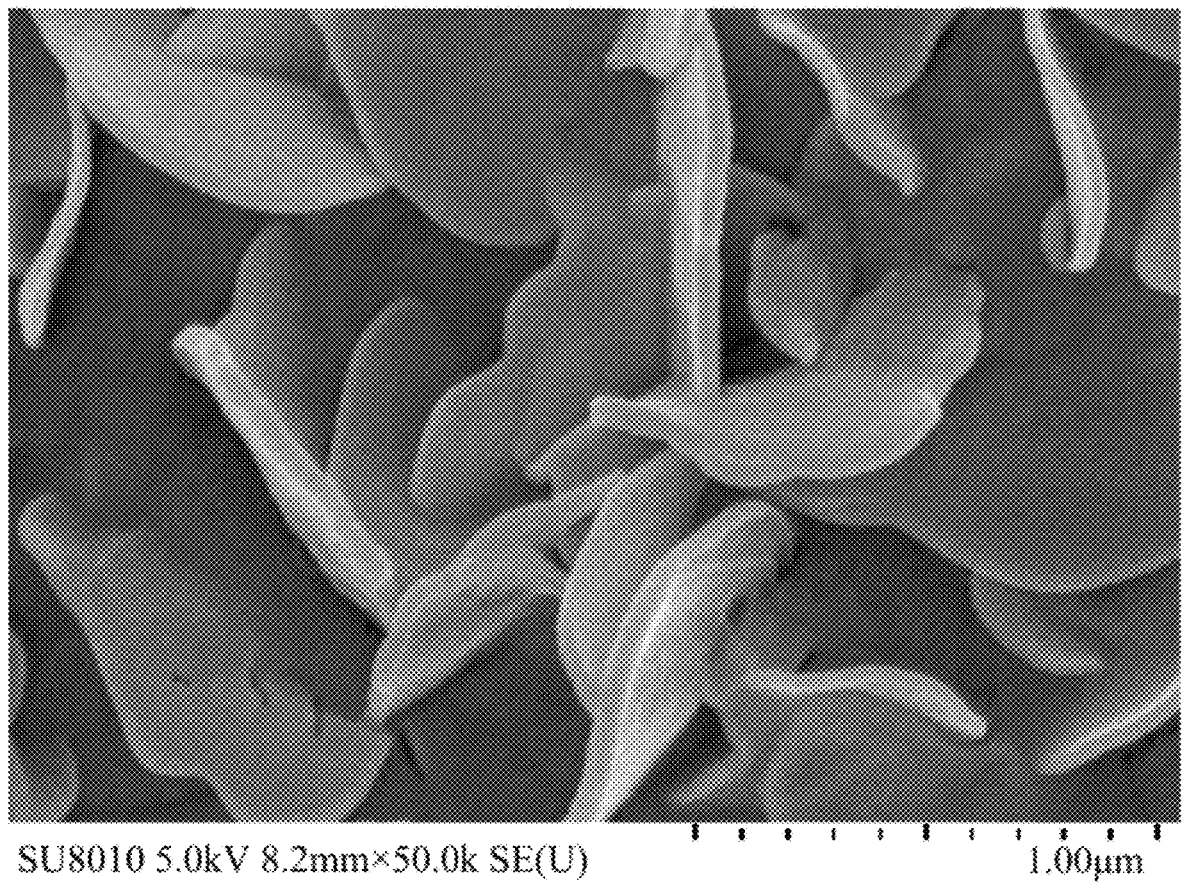
FIG. 1 is a SEM image of the organic Janus nanosheets prepared in Example 1 of this application.
Figure 2A:
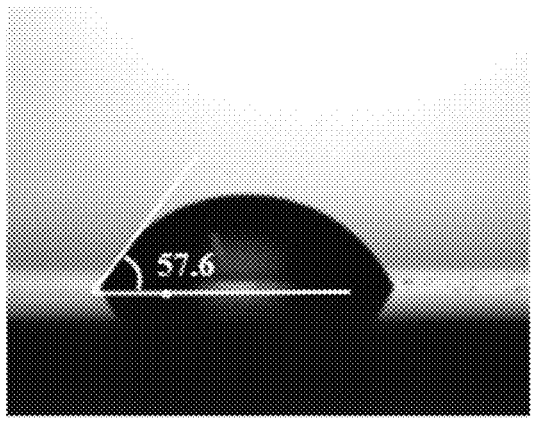
FIG. 2A show a contact angle of the organic Janus nanosheets prepared in Example 1 of this application before wetting modification on a surface of hydrophilic glass.
Figure 2B:
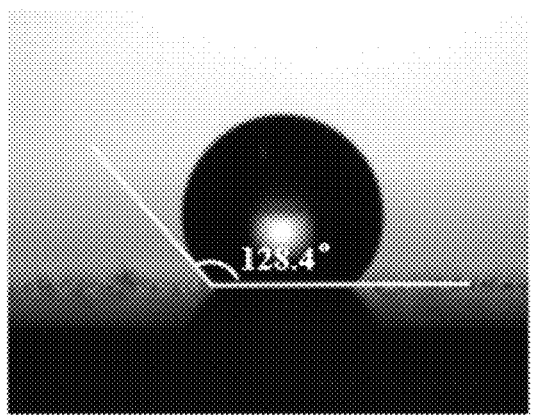
FIG. 2B show a contact angle of the organic Janus nanosheets prepared in Example 1 of this application after wetting modification on a surface of hydrophilic glass.
Figure 2C:
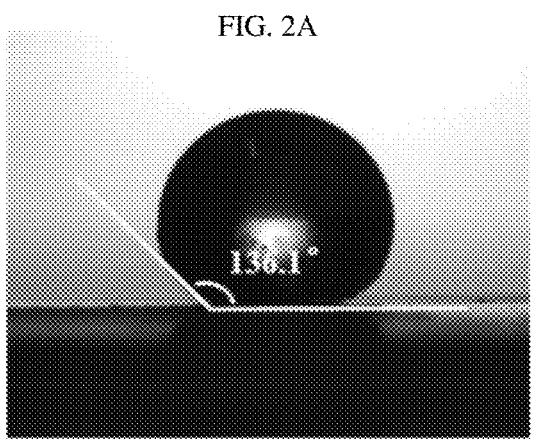
FIG. 2C show a contact angle of the organic Janus nanosheets prepared in Example 1 of this application before wetting modification on a hydrophobic modification surface.
Figure 2D:
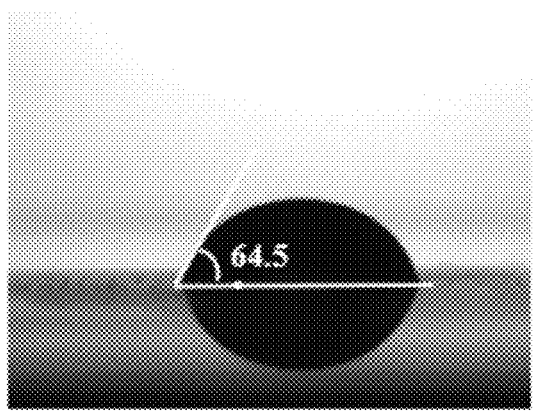
FIG. 2D show a contact angle of the organic Janus nanosheets prepared in Example 1 of this application after wetting modification on a hydrophobic modification surface.

FIG. 1 is the SEM image of the organic Janus nanosheets obtained in this example. It can be seen that the organic Janus nanosheets prepared by this application have a two-dimensional sheet structure.

FIGS. 2A-D show contact angles of organic Janus nanosheets prepared in this example before and after wetting modification on hydrophilic and hydrophobic surfaces, which proves that the nanosheet materials prepared in this application possess amphiphilic properties.

A glass substrate has hydrophilic characteristics, with a water contact angle of 57.6°; after the surface of the glass substrate is hydrophobically modified, the water contact angle becomes 136.1°. After these two substrates are coated with nanosheets respectively, both of them appear to have a wettability reversal, where original hydrophilic and hydrophobic surfaces are converted to hydrophobic and hydrophilic surfaces respectively. Therefore, according to the contact angle results, it can be confirmed that the nanosheet has amphiphilic property.

Example 2: Controllable Preparation of the Organic Janus Nanosheets with Different Particle Sizes The operation steps were as those in Example 1, except for changing the pH value adjusted by the ammonia water in the synthesis of the organic Janus nanosheets in step (3), and the total reaction time of steps (2) and (3), so as to test effects of different pH values and different reaction times on the particle sizes of the Janus nanosheets.

Figure 3:
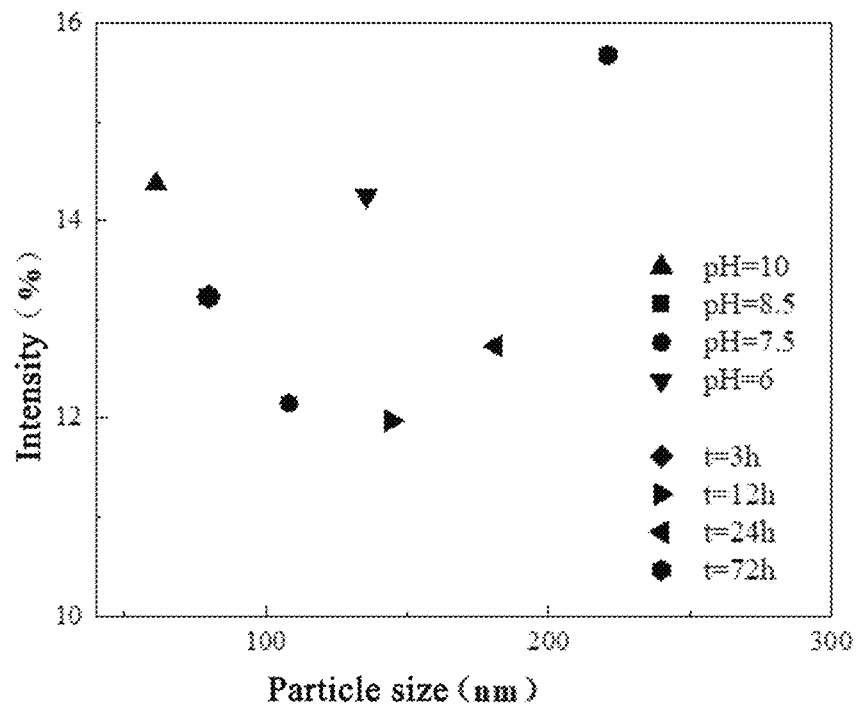
FIG. 3 is a particle size intensity diagram of the Janus nanosheets prepared under different pH values and different reaction times in Example 2 of this application.

FIG. 3 is the particle size intensity diagram of the nanosheets prepared under different pH values and different reaction times. It can be seen that with the increase of the pH value and the shortening of the reaction time, the particle size of the Janus nanosheets becomes smaller, which indicates that different reaction times and pH values can be regulated to control the size of the Janus nanosheets.

Example 3: Preparation of Ultra-Stable Aqueous $CO_2$ Foam with Organic Janus Nanosheets A TX-100 surfactant solution having a mass percentage of 0.4% was prepared and stirred for 5 min; then the organic Janus nanosheets prepared in Example 1 were dissolved in the surfactant solution, followed by stirring for 20 min to obtain a foaming solution by compounding the Janus nanosheets and the surfactant.

The foaming solution was poured into a stirring cup and sealed, $CO_2$ was introduced into the stirring cup to form $CO_2$ environment in the cup. The foam-based liquid is subjected to stirring for foaming by the Waring Blender method to obtain $CO_2$ foam, where the stirring speed is 8000 rpm/min and the stirring time is 3 min. The foam quality can be controlled to 40%-95%, and further controlled to 60%-90%.

Figure 4:
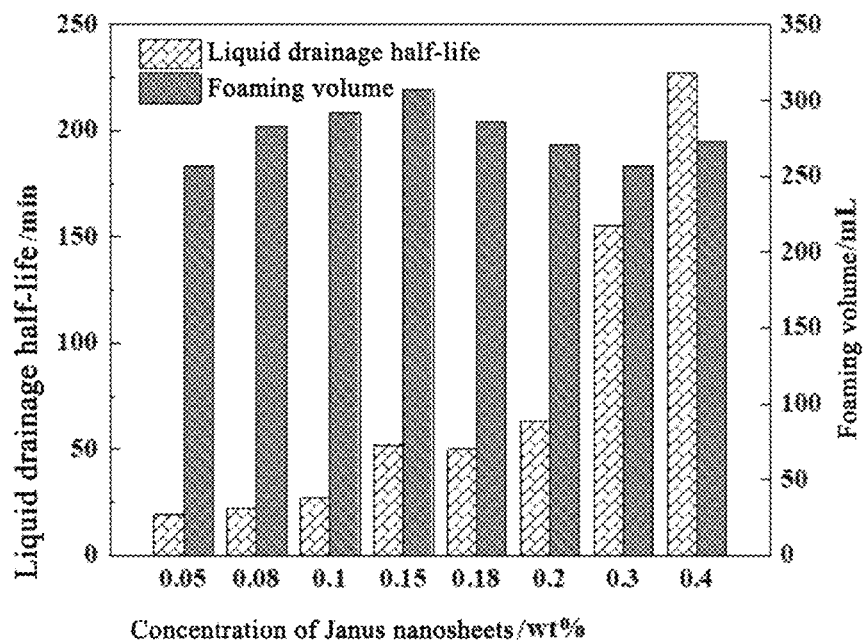
FIG. 4 shows the variation of the foam volume and liquid drainage half-life of the foam formed by compounding the organic Janus nanosheets and nonionic surfactants prepared in Example 3 of this application as a function of the concentration of the Janus nanosheets.

FIG. 4 shows the foaming effect of compounding of the nonionic surfactant with a mass percentage of 0.4% and the Janus nanosheets with different mass percentages, as can be seen:

in the process of gradually increasing the mass percentage of Janus nanosheets to 0.15%, the nanosheets in the solution are continuously adsorbed to the surface of the bubbles, gradually forming an armor-like coating state using their Janus characteristics and sheet shape to prevent the bubbles from draining and coalescence to achieve the effect of improving foam stability.

When the concentration of the Janus nanosheets is further increased, due to limited phase interface area of the surface of the bubbles, the nanosheet materials continue to accumulate and superimpose until the larger bubbles cannot withstand the adsorption of a large number of nanosheets and then break, and the nanosheets return to the liquid phase, resulting in a sharp increase in the viscosity of the solution. However, the increase of the viscosity of the solution causes the liquid drainage speed of the smaller bubbles in the system to be significantly decreased. Therefore, at this stage, the foaming volume of the foam decreases, and the half-life of the liquid drainage gradually increases.

What is claimed is:

1. A preparation method of an organic Janus nanosheet, comprising the following steps:
   S1: subjecting molecules with hydrophobic tail to spontaneous and ordered arrangement in a mixing solution of ethanol and water;
   the molecules with hydrophobic tail are octadecylamine or dodecylamine;
   a mass ratio of the molecules with hydrophobic tail, the ethanol and the water is 1:20-100:10-50;
   S2: adding molecules with hydrophilic head to the solution obtained in step S1, adjusting pH value of the solution to 6.0-6.5, and performing refluxing under an inert atmosphere for synthesis of organic Janus nanosheet monomers;
   the molecules with hydrophilic head are dopamine, tyramine or 2,4-dihydroxy phenethylamine;
   the refluxing is performed under the following conditions:
   an initial temperature is 50-80° C. which is lowered by 5-10° C. every 20-30 min, and gradually reduced to room temperature;

with respect to the solution obtained in step S2, the molecules with hydrophilic head have a mass percentage of 0.5-1.5%;

a mass ratio of the molecules with hydrophilic head to the molecules with hydrophobic tail is 1:2-5; and S3: adding ethanol to the solution obtained in step S2, adjusting pH value to 6.0-6.5, and heating to reflux; then adjusting the pH value to 7.0-8.0, adding sodium ethylate, adjusting a temperature to 70-85° C., and performing a reaction under an inert atmosphere, adding NaOH to adjust pH to 8.0-9.0, and stirring to be completely dissolved to obtain the organic Janus nanosheet;

the reaction time is 4-8 h;

a mass ratio of the ethanol to the solution obtained in step S2 is 1:1.5-3;

with respect to the solution obtained in step S3, the sodium ethylate has a mass percentage of 0.1-0.4%;

after the reaction is completed, the method further comprises the following purification steps:

adding ethanol and water to the system of step S3 in sequence for ultrasonic dispersion and centrifugation to obtain a solid product; and a volume ratio of the solution obtained in step S3, the ethanol and the water is 1:4-10:8-20.

2. The preparation method according to claim 1, wherein in step S1, the spontaneous and ordered arrangement has following steps:

adding the molecules with hydrophobic tail into the ethanol, and performing refluxing at 60-80° C. to be dissolved; then adding the water, stirring until no turbidity occurs; performing the spontaneous and ordered arrangement at 50-70° C.

3. A method for preparing an aqueous $CO_2$ foam with organic Janus nanosheets, comprising the following steps:

Sa: adding the organic Janus nanosheets to an aqueous solution of a surfactant, stirring to obtain a foaming solution; and Sb: introducing $CO_2$ into the foaming solution, and stirring to foam using a Waring Blender method to obtain the aqueous $CO_2$ foam;

wherein before step Sa, the organic Janus nanosheets are prepared according to the preparation method according to claim 1.

4. The method for preparing the aqueous $CO_2$ foam according to claim 3, wherein a liquid phase is obtained by adding the organic Janus nanosheets to the aqueous solution of the surfactant in step Sa, and with respect to the liquid phase, the surfactant has a mass percentage of less than 1.0%;

with respect to the liquid phase, the organic Janus nanosheets have a mass percentage of less than 0.7%; and the surfactant is anionic surfactant, cationic surfactant or nonionic surfactant.

* * * * *